United States Patent [19]

Kucera et al.

[11] 4,382,003

[45] May 3, 1983

[54] BREAKER SYSTEM FOR HYDRAULIC FRACTURING FLUIDS

[75] Inventors: Clare H. Kucera, Tulsa, Okla.; Richard B. Connell, Perryton, Tex.

[73] Assignee: The Dow Chemical Company, Midland, Mich.

[21] Appl. No.: 230,490

[22] Filed: Feb. 2, 1981

[51] Int. Cl.$^3$ .............................................. E21B 43/26
[52] U.S. Cl. ................................ 252/8.55 R; 166/308
[58] Field of Search ..................... 252/8.55 R, 8.55 C; 166/308

[56] References Cited

U.S. PATENT DOCUMENTS

| | | | |
|---|---|---|---|
| 3,960,736 | 6/1976 | Free et al. ........................... | 252/8.55 |
| 4,169,798 | 10/1979 | DeMartino .......................... | 252/8.55 |
| 4,202,795 | 5/1980 | Burnham et al. .............. | 252/8.55 X |
| 4,250,044 | 2/1981 | Hinkel ................................ | 252/8.55 |

*Primary Examiner*—Herbert B. Guynn
*Attorney, Agent, or Firm*—L. Wayne White

[57] ABSTRACT

Aqueous compositions having properties making them suitable for use as a hydraulic fracturing fluids are disclosed. These compositions comprise (a) an uncrosslinked aqueous polysaccharide solution, and (b) a 4,4'-thiodiphenol. Ingredient (b) acts as a "breaker" and causes the composition to lose viscosity at a controlled rate.

10 Claims, No Drawings

BREAKER SYSTEM FOR HYDRAULIC FRACTURING FLUIDS

BACKGROUND OF THE INVENTION

This invention pertains to novel aqueous compositions comprising an uncrosslinked aqueous polysaccharide solution, and a 4,4′-thiodiphenol. The aqueous compositions have properties making the composition suitable for use as a hydraulic fracturing fluid.

DESCRIPTION OF THE PRIOR ART

The use of aqueous solutions of polysaccharides as hydraulic fracturing fluids is well known. The polysaccharides add desirable viscosity properties to the aqueous hydraulic fluids and give such fluids better proppant carrying capacity. Various chemical and enzyme breakers have been added to such hydraulic fluids to reduce the viscosity of the fluids after they have served their purpose. It is thought that these breakers work by degrading the polymer structure.

Typical polysaccharides that have been used in preparing hydraulic fluids include guar, hydroxypropyl guar, carboxymethylcellulose, hydroxyethylcellulose, and the like. Such polysaccharides and polysaccharide derivatives form a known class of compounds.

The polysaccharides were added in amounts to give the desired viscosity. Typically the polysaccharide was added in amounts of up to about 80 pounds of polymer, dry weight basis, per 1000 gallons of formulated fluid. The most common range is from about 20 to about 80 pounds of polymer per thousand gallons.

The breakers used in such hydraulic fracturing systems also form a known class of compounds. Examples include the alkali metal persulfates (e.g. sodium persulfate, potassium persulfate, etc.) and ammonium persulfate, and the like. Of these, the most commonly used compounds are sodium persulfate and ammonium persulfate.

These persulfate breakers were added in amounts sufficient to "break" the viscosity of the viscous liquid under the downhole conditions of temperature and pressure. The persulfate breakers are exceedingly effective, and that is their curse as well as their benefit. From time to time, it would be advantageous to have a slower or more controlled rate of reaction during this thinning process. This would extend the "pot life" or workability time during which the fluids could be utilized as the hydraulic fracturing fluid before the viscosity became too low to be useable.

SUMMARY OF THE INVENTION

Novel aqueous compositions have now been discovered which have properties making them suitable for use as hydraulic fracturing fluids. The novel compositions comprise: (a) an uncrosslinked aqueous polysaccharide solution, and (b) a 4,4′-thiodiphenol.

The novel aqueous composition has desirable initial viscosities and a rate of "break" under downhole conditions that is considered to be highly desirable.

DETAILED DESCRIPTION OF THE INVENTION

By the term "breaker" is meant a chemical compound that will reduce the viscosity of an aqueous fluid thickened with a polysaccharide or polysaccharide derivative. The term "breaking" is applied to the process in which the viscosity of such a hydraulic fluid is lowered. This is the customary useage of such terms in the industry.

The novel aqueous compositions, as noted above, comprise an uncrosslinked aqueous polysaccharide solution. Any of the known class of polysaccharides can be suitably used herein at conventional loadings. However, the subgenus of compounds referred to in the industry as galactomannans are preferred, and hydroxypropyl guar is most preferred. Loading levels of from about 20 to about 80 pounds of polysaccharide are customarily preferred.

The novel compositions contain a 4,4′-thiodiphenol. This compound corresponds to the structural formula

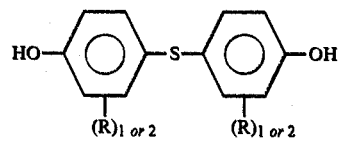

$$\text{HO}-\underset{(R)_{1\ or\ 2}}{\bigcirc}-S-\underset{(R)_{1\ or\ 2}}{\bigcirc}-\text{OH} \qquad I$$

each R independently is an inert substituent, such as hydrogen, hydroxyl, carboxyl, hydroxymethyl, halomethyl (e.g. chloromethyl bromethyl, etc.) bis($C_1$–$C_4$ alkyl) aminomethyl, aminomethyl, ($C_1$–$C_4$) alkylthiomethyl, mercaptomethyl, alkyl (e.g. methyl, ethyl, propyl, isobutyl, etc.), —$CH_2SO_3^-M^+$ where $M^+$ is an alkali metal, and the like. The 4,4′-thiodiphenols form a known class of compounds with known methods of preparation. It is added in amounts sufficient to break the viscosity of the compositions. Normally, amounts of up to about 5 pounds per 1000 gallons of formulated fluid are used and, in many instances, from about 0.75 to about 1.5 pounds per 1000 gallons is sufficient.

The actual amounts of the 4,4′-thiodiphenol that will be added will vary depending upon the polysaccharides chosen, the loading level of the polysaccharide, and the desired rate of break. Fortunately, the viscosity measurements and optimization of proportion of ingredients is easily within the skill of the art and does not require any undue experimentation. Thus, the skilled artisan can tailor the composition to fulfill a particular need.

Conventional additives for hydraulic fracturing fluids can be included in the present aqueous compositions, if desired. For example, in many instances it is desirable to add a proppant to the composition if it is to be used as a hydraulic fracturing fluid. Typical proppants include sand (usually 20/40 mesh sand), sintered bauxite, glass beads, etc. In other instances it is desirable to add a gas to the fracturing fluid to "energize" the fluid. For example, it is conventional to add gaseous carbon dioxide or nitrogen to hydraulic fracturing fluids. These materials as well as other conventional additives are well known or obvious to the skilled artisan, as are other uses for the novel compositions.

Experimental

In a series of experiments, a solution was prepared by blending hydroxypropyl guar (HPG) in fresh water at a loading level of 40 pounds of HPG per 1000 gallons of water (lbs/1000 gal). 4,4′-thiodiphenol (TDP) was then added with stirring and the viscosity of the resulting solution was measured over a period of time using a Fann 50 C model rotational viscometer at 170 reciprocal seconds. The data are summarized in Table I.

TABLE I

| Run | Additive(s) | lbs/1000 gal | Viscosity (cps) 1 hr | 2 hr | 3 hr | 4 hr |
|---|---|---|---|---|---|---|
| 1 | Control | None | 14.1 | 11.7 | 9.6 | 7.9 |
| 2 | $(NH_4)_2S_2O_8$ | 5 | 1.0 | 0.9 | 0.6 | 0.6 |
| 3 | $Na_2S_2O_8$ | 5 | 1.0 | 0.8 | 0.6 | 0.6 |
| 4 | TDP | 1 | 12.4 | 7.0 | 4.0 | 2.4 |
| 5 | TDP | 5 | 7.6 | 4.6 | 3.6 | 2.0 |

These data show that 4,4'-thiodiphenol is useful as a breaker and that the rate of break is more controlled and much slower than the persulfate breakers. This provides a longer period of workability for the present compositions.

We claim:

1. A formulated fluid composition having properties making it suitable for use as a hydraulic fracturing fluid, said composition comprising:
   (a) a viscosity-increasing amount of an uncrosslinked aqueous polysaccharide solution, and
   (b) a 4,4'-thiodiphenol corresponding to the formula

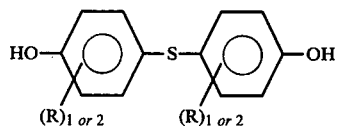

wherein each R is hydrogen or an inert substituent, said 4,4'-thiodiphenol being present in amounts sufficient to break the viscosity of said composition.

2. The composition defined by claim 1 wherein (a) is present in amounts of from about 20 to about 80 pounds of polysaccharide, dry weight basis, per 1,000 gallons of formulated fluid.

3. The composition defined by claim 1 wherein each R independently is hydrogen, hydroxyl, carboxyl, hydroxymethyl, halomethyl, bis($C_1$-$C_4$ alkyl) aminomethyl, aminomethyl, mercaptomethyl, alkyl, or —$CH_2SO_3^-M^+$, where M is an alkali metal.

4. The composition defined by claim 1 wherein said polysaccharide is a galactomannan.

5. The composition defined by claim 1 wherein said polysaccharide is guar, hydroxypropylguar, carboxymethylcellulose or hydroxyethylcellulose.

6. The composition defined by claim 5 wherein said polysaccharide is hydroxypropylguar.

7. The composition defined by claim 4 wherein (b) is present in amounts of up to about 5 pounds per 1000 gallons of the composition.

8. The composition defined by claim 7 where (b) is present in amounts of from about 0.75 to about 1.5 pounds per 1,000 gallons of formulated fluid.

9. The composition defined by claim 1 wherein:
   (a) is hydroxypropylguar and is present in amounts of from about 20 to about 80 pounds of polysaccharide, dry weight basis, per 1,000 gallons of formulated fluid, and
   (b) is 4,4'-thiodiphenol and is present in amounts of from about 0.75 to about 1.5 pounds per 1,000 gallons of formulated fluid.

10. In a process of fracturing a subterranean earth formation by injecting a hydraulic fracturing fluid into a wellbore under an elevated pressure sufficient to fracture the formation, the improvement comprising using the composition of claims 1 or 9 as the hydraulic fracturing fluid.

* * * * *